United States Patent
Matsuo et al.

(10) Patent No.: US 7,699,590 B2
(45) Date of Patent: Apr. 20, 2010

(54) OIL PUMP AND AUTOMATIC TRANSMISSION INCLUDING THE SAME

(75) Inventors: Akira Matsuo, Anjo (JP); Akihito Hongoya, Anjo (JP); Mikio Iwase, Anjo (JP); Yoshinori Shibayama, Anjo (JP); Makoto Kaneso, Toyota (JP); Kamishima Hirofumi, Toyota (JP); Atsushi Hanawa, Toyota (JP); Koichi Miyamoto, Toyota (JP); Haruhisa Suzuki, Toyota (JP)

(73) Assignees: Aisin AW Co., Ltd. (JP); Aisin Takaoka Co., Ltd. (JP); Toyota Jidosha Kabushiki Kaisha (JP)

( * ) Notice: Subject to any disclaimer, the term of this patent is extended or adjusted under 35 U.S.C. 154(b) by 880 days.

(21) Appl. No.: 10/585,188

(22) PCT Filed: Feb. 18, 2005

(86) PCT No.: PCT/JP2005/002625

§ 371 (c)(1),
(2), (4) Date: Jul. 3, 2006

(87) PCT Pub. No.: WO2005/078285

PCT Pub. Date: Aug. 25, 2005

(65) Prior Publication Data

US 2009/0180908 A1    Jul. 16, 2009

(30) Foreign Application Priority Data

Feb. 18, 2004    (JP) .............................. 2004-041710

(51) Int. Cl.
  F04C 18/00    (2006.01)
  F04C 15/00    (2006.01)
  F01C 21/18    (2006.01)
(52) U.S. Cl. .................... 418/171; 418/180; 418/189

(58) Field of Classification Search ................. 418/164, 418/166, 168, 169, 170, 171, 180, 189
See application file for complete search history.

(56) References Cited

U.S. PATENT DOCUMENTS 4,767,296 A * 8/1988 Satomoto et al. ............ 418/171

(Continued)

FOREIGN PATENT DOCUMENTS

JP    01273887 A  * 11/1989

(Continued)

*Primary Examiner*—Thomas E Denion
*Assistant Examiner*—Mary A Davis
(74) *Attorney, Agent, or Firm*—Bacon & Thomas, PLLC

(57) ABSTRACT

An oil pump includes a pump cover covering a recess in a side face of a pump body to form a gear compartment therebetween. A drive gear and a rotatably driven gear are meshed and mounted in the gear compartment. Working spaces R are formed by the engagement of the meshed gear teeth. Discharge ports are formed in both the pump body and the pump cover in communication with the gear compartment. A notch is formed in the pump body at the bottom of the gear compartment and extends from the front end of the discharge port in the pump body to the rear end of a discharge area for the working spaces. Another notch is formed in the inner side face of the pump cover, and extends from the front end of the discharge port in the cover to the rear end of the discharge area.

8 Claims, 3 Drawing Sheets

U.S. PATENT DOCUMENTS 5,096,398 A * 3/1992 Cozens .................. 418/171
5,413,470 A * 5/1995 Eisenmann ............. 418/171
6,544,021 B2 * 4/2003 Watanabe et al. ........ 418/171

FOREIGN PATENT DOCUMENTS

| JP | 03134279 A | * | 6/1991 |
| JP | 04005476 A | * | 1/1992 |
| JP | 11082644 A | * | 3/1999 |
| JP | 2003-161269 | | 6/2003 |
| JP | 2003-172270 | | 6/2003 |
| JP | 2003161269 A | * | 6/2003 |

* cited by examiner

FIG. 6
(PRIOR ART)
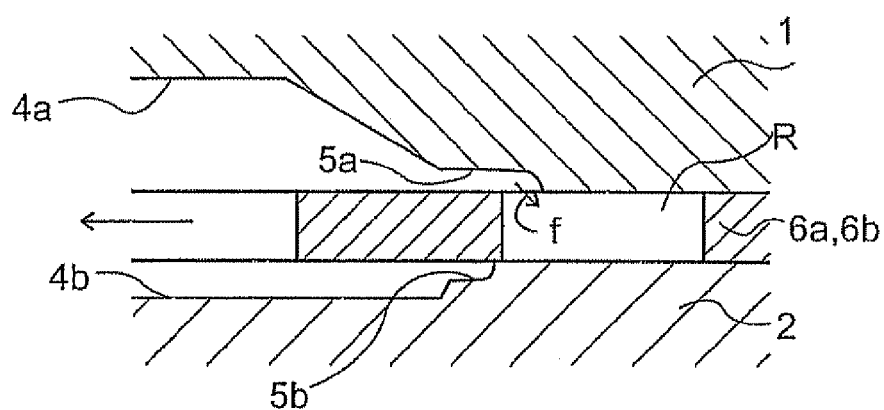
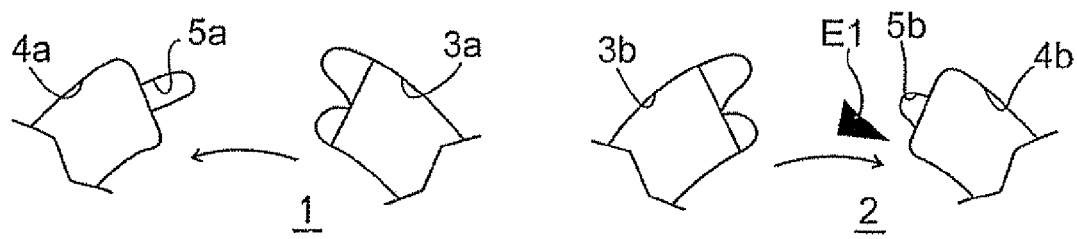
FIG. 7(a)　　　　FIG. 7(a)
(PRIOR ART)　　(PRIOR ART)

OIL PUMP AND AUTOMATIC TRANSMISSION INCLUDING THE SAME

BACKGROUND OF THE INVENTION

1. Technical Field

The present invention relates to oil pumps suitable for supplying working oil to automatic transmissions in vehicles such as automobiles.

2. The Related Art

An oil pump for an automatic transmission designed to reduce cavitation erosion is disclosed in Japanese Patent Kokai Publication No. 2003-161269. As disclosed therein, the oil pump includes a cast-iron pump body having a circular hollow formed in a face thereof; and a light-alloy pump cover closing the hollow within the pump body, thereby forming a gear compartment (pump chamber) therebetween. A drive gear is supported and driven by a drive shaft journaled in the gear compartment of the pump body, and a driven gear is disposed in the gear compartment so as to be rotatable eccentric to the drive gear and driven by the drive gear meshed with the driven gear; an arc-shaped suction port and an arc-shaped discharge port are located at the bottom of the gear compartment in a suction area and a discharge area, respectively. Working fluid spaces are defined between teeth on the outer circumferential surface of the drive gear and teeth on the inner circumferential surface of the driven gear and between side walls of the chamber bottom and the cover. Thus, the working fluid spaces are arrayed circumferentially around the pump chamber. An arc-shaped suction port is formed in the pump body and an arc-shaped discharge port is formed in the inner side face of the pump cover in the suction area and in the discharge area, respectively, for communication with the rotating working spaces.

With the oil pump disclosed in Japanese Patent Kokai Publication No. 2003-161269 (hereinafter simply referred to as the "prior art"), cavitation erosion is limited to an expected normal or tolerable level when the rotational speed of the drive gear is in a normal range of use (for example, up to 7,000 rpm). However, when the rotational speed of the drive gear is higher than that (for example, 7,500 rpm), the cavitation erosion of the pump cover greatly increases to an unacceptable level. This problem will now be described with reference to FIGS. 6 and 7.

In the prior art oil pump, a notch 5a is formed in the chamber side face of the pump body, i.e. in the "bottom" of the pump chamber (also see pump body 10 and chamber 11 in FIG. 1), and extends circumferentially from the front end of a discharge port 4a formed in the pump body to the rear end of a suction port 3a formed in the pump body in the suction area for the working spaces. In addition, a notch 5b formed in the pump cover 2, shorter than the notch 5a, extends circumferentially from the front end of a discharge port 4b formed in the cover to the rear end of a suction port 3b formed in the cover. When the drive gear 6a and driven gear 6b are rotated in the direction of the arrow during operation of the oil pump, working spaces R formed between the teeth of the gears 6a and 6b first come into communication with the discharge port 4a through the notch 5a. Since the working spaces R were in communication with the suction ports 3a and 3b until immediately before, the working spaces R are filled with low-pressure working oil entraining bubbles of a gas of volatiles from the working oil and air released from the working oil. Because the pressure of the working oil in the discharge ports 4a and 4b is significantly higher than that at the suction ports, when the working spaces R come into communication with the notch 5a, the high-pressure working oil in the discharge port 4a temporarily flows back from the pump body 1 toward the opposing inner side face of the pump cover 2 and into the working spaces R as indicated by an arrow f. Thus, the bubbles in the working spaces R collapse (become smaller), and the impact pressure occurring due to that collapsing causes cavitation erosion at the inner chamber side face of the pump cover in the vicinity where the bubbles collapse.

When the rotational speed of the oil pump is less than or equal to a predetermined limit, a small number of bubbles are present in the working spaces R, the pressure of the working oil in the discharge ports 4a and 4b is not very high, and the rate of inflow into the working spaces R is also low. Therefore, the collapsing of the bubbles mainly occurs adjacent the bottom of the pump body 1, but is not relatively noticeable. Thus, cavitation erosion of the pump body 1 can be prevented by forming the pump of a material, such as cast iron, having a high resistance to cavitation erosion. Accordingly, the prior art technology is effective in preventing cavitation erosion when the rotational speed of the oil pump is less than or equal to the predetermined limit.

However, when the rotational speed of the oil pump exceeds the predetermined limit, the pressure in the working spaces R is reduced, the volume of bubbles is increased, and the bubbles accumulate adjacent the inner circumference due to the increased centrifugal force. Moreover, the pressure of the working oil in the discharge ports 4a and 4b is increased, and the rate of inflow into the working spaces R is also increased. Accordingly, the position where the collapsing of the bubbles occurs is shifted to the inner side face of the pump cover 2, and more bubbles collapse. Since the pump cover 2 is composed of a material, such as aluminum, having low resistance to cavitation erosion, cavitation erosion occurs at the position indicated by symbol E1 at the inner side face of the pump cover 2, as shown in FIG. 7(b). Thus, gaps are formed between the pump gears 6a and 6b, and pump efficiency is reduced due to leaking of the working oil. It is believed that cavitation erosion occurs at the pump cover 2 by the above-described mechanism when the rotational speed of the oil pump exceeds the predetermined limit.

To solve the above-described problem, theoretically it would be possible to form the pump cover 2 of a metallic material having high resistance to cavitation erosion, e.g. aluminum with, for example, T6 heat treatment for increasing the surface strength or high-silicon aluminum alloy. However, such materials do not always solve the problem because of the large volume of bubbles in the working spaces R which are collapsed (crushed), and therefore, a material such as cast iron having high resistance to cavitation erosion is required. In such a case, the weight of the oil pump is disadvantageously increased since both the pump body 1 and the pump cover 2 are composed of cast iron. When such a heavy oil pump is installed in an automotive automatic transmission, the pump body or the pump cover of the oil pump cannot be integrated with the transmission housing which is composed of a light alloy, resulting in a complicated structure.

DISCLOSURE OF INVENTION

To solve the above-described problem, the present invention provides an oil pump capable of reducing cavitation erosion during high-speed rotation of the gears even when the pump cover is composed of a conventional light alloy.

According to the present invention, the above-described object can be achieved by an oil pump including a pump body having a hollow recess in a side face thereof; a pump cover having an inner side face closing the hollow recess to form a gear compartment; a drive gear driven by a drive shaft and rotatably supported in the gear compartment; a rotatable driven gear rotatably supported in the gear compartment and driven by the drive gear; a discharge port formed in the pump body and a discharge port formed in the pump cover, the discharge ports defining, within the gear compartment, a discharge area for working spaces formed by the engagement of teeth of the drive gear with teeth of the driven gear; a notch formed in the pump body and extending from the front end of the discharge port to the rear end of the discharge area; and a notch formed in the cover and extending from the front end of the discharge port to the rear end of the discharge area. One of the pump body and the pump cover is formed of cast iron and the other is formed of a light alloy. The length of the notch formed in the pump body or the pump cover formed of the light alloy is longer than that of the notch formed in the pump body or the pump cover composed of the cast iron. Bubbles generated within the oil in the working spaces during high-speed rotation of the drive gear are reduced by the high-pressure working oil flowing back into the working spaces through the longer notch in the pump body or the pump cover formed of the cast iron.

It is preferred that the driven gear be a rotatable internal gear (having internal gear teeth) having its outer circumference supported by the inner circumferential surface of the gear compartment; that the drive gear be an external gear meshing with the driven gear; that the discharge port in the pump body and the discharge port in the pump cover each be arc-shaped; and that the notch in the pump body and the notch in the pump cover extend circumferentially from the front ends of the discharge port in the pump body and the discharge port in the pump cover, respectively, to the rear end of the discharge area.

It is further preferred that the notch formed in the pump body or the pump cover composed of the light alloy have an approximately triangular shape and a width decreasing from the front end of the discharge port toward the rear end of the discharge area.

Moreover, it is preferred that the notch formed in the pump body or the pump cover composed of the light alloy have an inclined bottom so that its depth decreases from the front end of the discharge port toward the rear end of the discharge area.

Furthermore, the present invention provides an automatic transmission having, as a supply source of hydraulic pressure, the oil pump according to the present invention, wherein the pump body or the pump cover composed of the light alloy is integrated with the housing of the automatic transmission.

BRIEF DESCRIPTION OF THE DRAWINGS

FIG. 4(a) illustrates part of the bottom of a hollow portion of a pump body, and FIG. 4(b) illustrates part of an inner side face of a pump cover;

FIG. 6 is a cross-sectional view, corresponding to FIG. 2, of a prior art oil pump; and FIGS. 7(a) and 7(b) are partial views, corresponding to FIGS. 4(a) and 4(b), of the prior art oil pump of FIG. 6.

DESCRIPTION OF PREFERRED EMBODIMENTS

A preferred embodiment of an oil pump according to the present invention will now be described with reference to FIGS. 1 to 5. The oil pump of this preferred embodiment is suitable for supplying working fluid to an automatic transmission for a vehicle such as an automobile and includes: a housing H consisting of a pump body 10 and a pump cover 15 connected to each other, and pump gears consisting of a drive gear 30 and a driven gear 31 rotatably mounted in the housing H. The pump cover 15 is integrated with a housing of an automotive automatic transmission.

Figure 1:
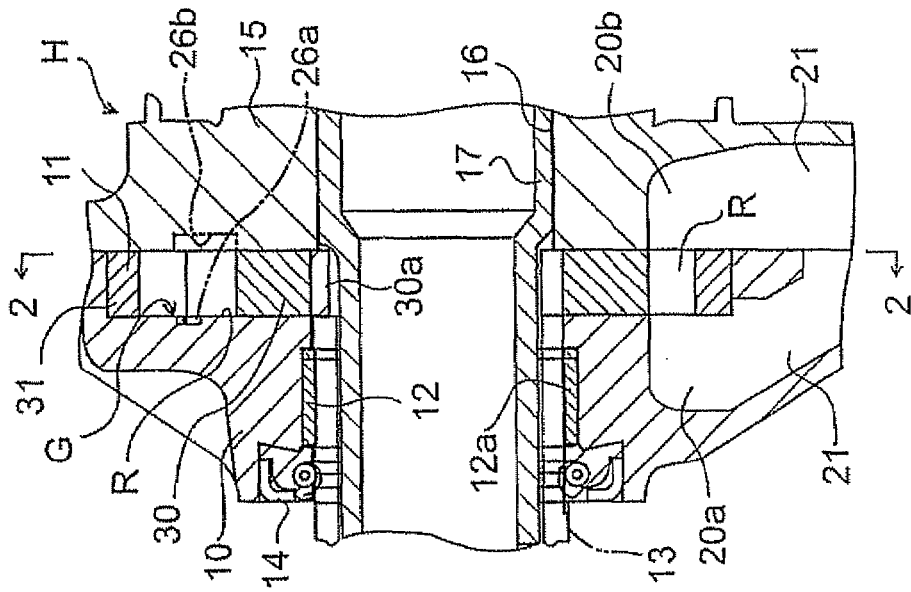
FIG. 1 is a cross-sectional view of an oil pump according to an embodiment of the present invention.

The pump body 10 is composed of a metallic material such as cast iron having high resistance to cavitation erosion. As shown in FIG. 1, a narrow circular chamber 11, which accommodates the rotatable pump gears 30 and 31, is formed in a flat side face of the pump body 10. A center hole 12 passes through the pump body 10, opens into the chamber (gear compartment) 11 and is axially offset from the center of the hollow portion 11 by a distance equal to an axial offset between the pump gears 30 and 31. The pump cover 15 is composed of a light alloy such as aluminum having less resistance to cavitation erosion than the cast iron of the pump body 10. The pump cover 15 is bolted to the pump body 10 with a flat side face thereof hermetically covering (closing) the chamber 11, thus forming a gear compartment G, accommodating the pair of pump gears 30 and 31, between the pump body 10 and the pump cover 15. A tubular stator shaft 17 is pressed into a center hole 16 formed in the pump cover 15, coaxial with the center hole 12 of the pump body 10, and passes through the pump body 10 with an annular space between it and the peripheral wall defining the center hole 12. A tubular drive shaft 13 is fitted into the annular space between the stator shaft 17 and the center hole 12, and is rotatably supported by a bushing 12a fixed to the peripheral wall defining the center hole 12. The annular space between the drive shaft 13 and the pump body 10 is sealed by an oil seal 14.

The drive gear 30 and the driven gear 31, having one more tooth than the drive gear 30, have the same thickness and trochoidal teeth meshed with each other. The gears 30 and 31 are axially offset. Both side faces of these gears are located sufficiently close to the inner side faces of the gear compartment G to substantially prevent leakage therebetween and are slidable and rotatable relative to the inner side faces of the gear compartment G. The drive gear 30 has its inner circumference fixed to the outer circumference of an end of the drive shaft 13 by a pair of keys 30a protruding into keyways formed in the end of the drive shaft 13, such that the drive gear 30 can be rotatably driven by the drive shaft 13. The outer circumference of the driven gear 31 is rotatably supported by the inner circumferential surface of the hollow chamber 11.

Figure 2:
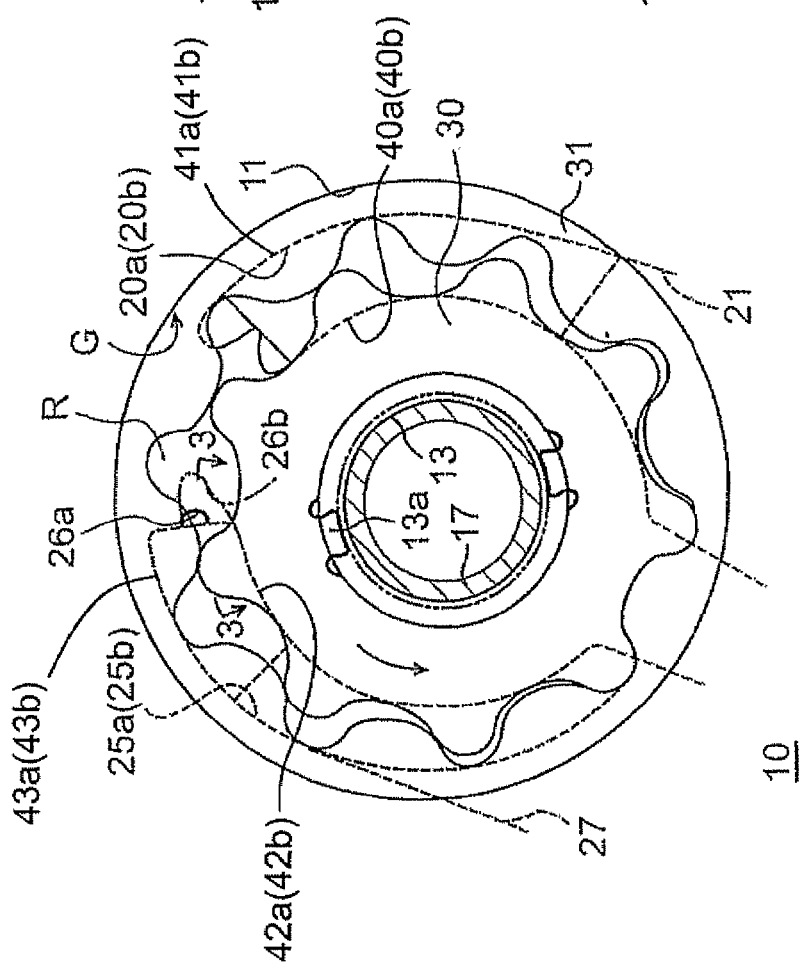
FIG. 2 is a cross-sectional view taken along line 2-2 in FIG. 1.

As shown in FIG. 2, a plurality of working spaces R are formed between the teeth of the pump gears 30 and 31 which are in mesh. As the pump gears 30 and 31 are rotated, the working spaces R move along an annular space formed between the root circles of the pump gears 30 and 31, and each volume of the working spaces R alternately increases and decreases. A suction area where the volumes of the working spaces R gradually increase during the rotation of the pump gears 30 and 31 is formed through a range of 180° from a contact position of pitch lines of the pump gears 30 and 31 in the rotational direction of the pump gears 30 and 31, and a discharge area where the volumes of the working spaces R gradually decrease during the rotation of the pump gears 30 and 31 is formed in a range of 180° from the contact position of the pitch lines of the pump gears 30 and 31 in the direction opposite the rotational direction.

As shown in FIGS. 1 and 2, a suction port 20a extending through the pump body 10 and a suction port 20b extending through the cover are in opposition to each other and are in communication with the bottom of the chamber 11 in the pump body 10. The openings of the suction ports 20a and 20b have the same arc-shape and their areas are equal. The radially inner edges 40a and 40b and the radially outer edges 41a and 41b of the suction ports 20a and 20b correspond to (are axially aligned with) the root circles of the pump gears 30 and 31, respectively. The suction ports 20a and 20b communicate with suction channels 21 formed in the pump body 10 and the pump cover 15 and introduce the working oil from a reservoir (not shown).

Figure 3:
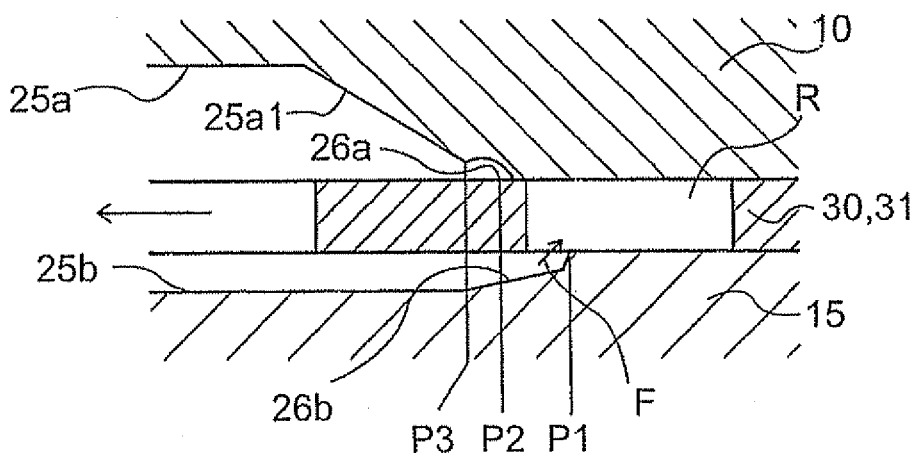
FIG. 3 is a cross-sectional view taken along line 3-3 in FIG. 2.

As seen in FIG. 3, a discharge port 25a formed in the pump body 10 and a discharge port 25b formed in the cover are arranged in opposition to each other in the bottom of the chamber 11 and extend over considerable portions of the discharge area short of both ends of the discharge area. Openings of the discharge ports 25a and 25b are arc-shaped and have equal areas. The radially inner edges 42a and 42b and the radially outer edges 43a and 43b of the discharge ports 25a and 25b correspond to the root circles of the pump gears 30 and 31, respectively. A sloped surface 25a1 having a depth decreasing toward the front end (in the rotational direction), where the discharge port 25a first comes into communication with the moving working spaces R, is formed in part of the bottom of the discharge port 25a. The discharge port 25a formed in the pump body 10 communicates with a discharge channel 27 formed in the pump body 10 and the pump cover 15. The discharge port 25b formed in the pump cover 15 is made shallower than the discharge port 25a formed in the pump body 10 and is isolated from a fluid channel (not shown) formed in the pump cover 15 and from the discharge channel 27.

Figure 4A:
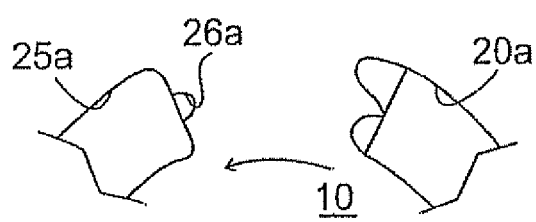
FIGS. 4(a) and 4(b) illustrate the arrangement of ports and notches in the embodiment shown in FIG. 1.
Figure 4B:
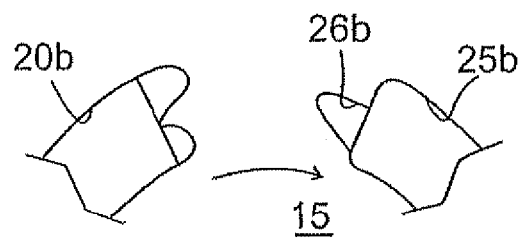
Figure 5:
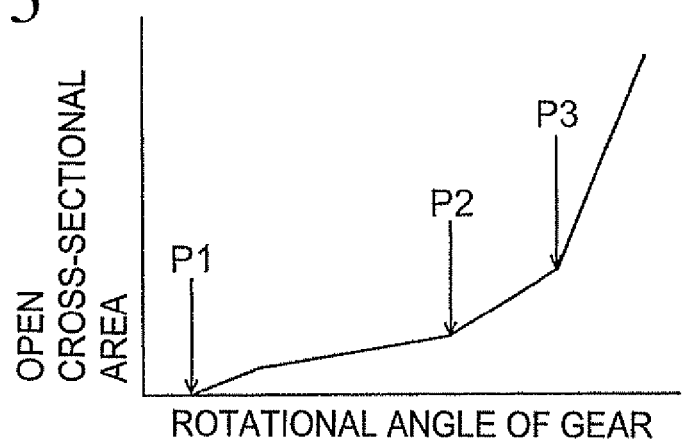
FIG. 5 is a graph of the relationship between rotational angles of pump gears and open cross-sectional areas between working spaces and discharge ports in the embodiment shown in FIG. 1.

As shown in FIGS. 1 to 4, a notch 26a is formed in the pump body 10 in communication with the discharge port 25a and a notch 26b is formed in the cover 15 in communication with the discharge port 25b. The notches 26a and 26b extend from the front, in the direction of rotation, ends of the discharge ports 25a and 25b circumferentially to the rear ends of the suction ports 20a and 20b, respectively. The notch 26b formed in the cover 15 is longer than the notch 26a formed in the body 10. The length of the longer notch 26b is a fraction (for example, ¼) of the distance between the rear, in the direction of rotation, ends of the suction ports 20a and 20b and the front ends of the discharge ports 25a and 25b. The length of the shorter notch 26a is approximately one half to one quarter that of the notch 26b. In this embodiment, as shown in FIGS. 2 to 4, the notch 26b in the cover has an approximately triangular shape and a width decreasing from the front end of the discharge port 25b toward the rear end of the suction port 20b, when viewed from the side of the pump body 10. Also, the bottom of the notch 26b in the cover is inclined so as to reduce its depth from the front end of the discharge port 25b toward the rear end of the suction port 20b.

In FIG. 2, during the operation of the oil pump according to this embodiment, the pump gears 30 and 31 are rotated by the drive shaft 13 in the direction of the arrow, i.e. counterclockwise, and the working spaces R are rotated in the same direction while the volumes thereof change. In FIG. 3, the pump gears 30 and 31 and the working spaces R are moved leftward as indicated by the arrow. As a result, the working oil in the reservoir passes through the suction channels 21, through the suction ports 20a and 20b into the working spaces R in the suction area and is discharged from the working spaces R in the discharge area, through the discharge ports 25a and 25b, and through the discharge channel 27.

Since the pressure of the working oil in the suction area is negative, the working oil entering from the suction ports 20a and 20b into the working spaces R includes entrained gas bubbles. The working spaces R sucking the working oil move with the rotation of the pump gears 30 and 31, and are closed in direction of rotation between the rear ends of the suction ports 20a and 20b and the front ends of the discharge ports 25a and 25b. As shown in FIG. 3, when the tips of the working spaces R rotate past a first release point P1 (See FIG. 5), at the tip (front end) of the notch 26b in the pump cover 15, the working spaces R communicate with the discharge port 25b in the cover through the notch 26b. Furthermore, when the tips of the working spaces R rotate past a second release point P2, at the tip (front end) of the notch 26a in the pump body 10, the working spaces R communicate with the discharge port 25a in the pump body 10 through the notch 26a in addition to the communication through the notch 26b. Finally, when the tips of the working spaces R rotate past a third release point P3, at the front ends of the discharge ports 25a and 25b, the working spaces R come into direct communication with the discharge ports 25a and 25b. Accordingly, open cross-sectional areas between the working spaces R and the discharge ports 25a and 25b that are filled with the working oil, trapped in the space between the bottom face (wall) of the chamber 11 and the inner end face of the pump cover 15 and containing bubbles due to the low pressure, are acceleratingly and continuously increased, in accordance with the rotational angles of the pump gears 30 and 31, as indicated by the solid line shown in FIG. 5.

As shown in FIG. 3, when the tips of the working spaces R that are closed in the space between the bottom of the hollow portion 11 and the inner end face of the pump cover 15 rotate past the first release point P1 so as to communicate with the discharge port 25b through the tip (front end) of the notch 26b, the high-pressure working oil in the discharge port 25b temporally flows back into the working spaces R as indicated by an arrow F. Thus, the pressure in the working spaces R is increased, and the bubbles therein are crushed. When the pump gears 30 and 31 are rotated beyond the point where communication starts, the opening area of the longer notch 26b in the cover is increased relative to the working spaces R. Accordingly, the rate of inflow of the working oil from the discharge port 25b in the cover into the working spaces R is reduced, and therefore, fewer bubbles in the working spaces R are crushed. When the shorter notch 26a is brought into communication with the working spaces R, the rate of inflow into the working spaces R is further reduced, and still fewer bubbles in the working spaces R are crushed.

When the rotational speed of the oil pump is less than or equal to a predetermined limit (for example 7,000 rpm), a small number of bubbles are present in the working spaces R, and the pressure of the working oil in the discharge ports 25a and 25b is also not very high. In addition, the rate of inflow of the working fluid from the notch 26b toward the bottom of the side wall of the chamber 11 of the pump body 10 and into the working spaces R, as indicated by the arrow F in FIG. 3, is low. Thus, the reduction of the bubbles occurs mainly adjacent the inner side face of the pump cover 15, but the reduction is not relatively noticeable. Therefore, if the pump cover 15 is composed of a material such as aluminum having low resistance to cavitation erosion, the small amount of cavitation erosion that occurs at the inner side face is substantially insignificant. As described above, as the pump gears 30 and 31 rotate further, beyond the point where communication starts, the rate of inflow of the working oil from the discharge port 25b into the working spaces R is reduced, and therefore, the cavitation erosion that occurs at the inner side face of the pump cover 15 is further reduced.

When the rotational speed of the oil pump exceeds the predetermined limit (for example 7,500 rpm), the pressure in the working spaces R is reduced. Then, the volume of bubbles is increased, and the bubbles accumulate adjacent the inner circumference of the working spaces R due to the centrifugal force. Moreover, the pressure of the working oil in the discharge ports 25a and 25b increases, and the rate of inflow of the working fluid that flows toward the bottom of the chamber 11 of the pump body 10, into the working spaces R as indicated by the arrow F, is also increased. Accordingly, the position where the bubbles are collapsed (reduced in size) occurs is shifted toward the area adjacent the bottom of the chamber 11 (pump body side surface) in the working spaces R, and also, more bubbles are thereby collapsed. However, the pump body 10 is composed of a material such as cast iron having high resistance to cavitation erosion, so that the collapsing bubbles are shifted to an area highly resistant to the cavitation erosion the bottom of the chamber 11 which is formed in the pump body 10. In addition, as described above, as the pump gears 30 and 31 rotate beyond the point where communication starts, the area of the opening of the notch 26b is increased, the shorter notch 26a is brought into communication with the working spaces R, and therefore, the position where the bubbles are collapsed is shifted toward an area adjacent the inner side face of the pump cover 15. However, since the rate of inflow of the working oil from the notches 26a and 26b into the working spaces R is reduced, the cavitation erosion is also reduced.

In the above-described embodiment, the notch 26b in the cover 15 has an approximately triangular shape and a width decreasing from the front end of the discharge port 25b toward the suction port 20b, and also, the bottom of the notch 26b is inclined so as to gradually reduce its depth. With this structure, the area of the opening of the notch 26b relative to the working spaces R is immediately increased with rotation of the pump gears 30 and 31, the rate of inflow of the working oil from the notch 26b into the working spaces R is immediately reduced, and therefore, the collapsing (reduction) of the bubbles is also immediately reduced. Accordingly, when the rotational speed of the oil pump is less than or equal to a predetermined limit, the small amount of cavitation erosion that occurs at the inner end face of the pump cover 15 is further reduced. However, the present invention is not limited to the embodiments described above. For example, the notch 26b in the cover 15 may have a predetermined width and length, as in the case of notch 5a of the prior art shown in FIGS. 6 and 7.

Furthermore, in the above-described embodiment, the driven gear 31 is a rotatable internal gear having its outer circumferential surface supported by the inner circumferential surface of the gear compartment G, and the drive gear 30 is an external gear that meshes with the driven gear 31. With this structure, the drive gear 30 can be accommodated in the driven gear 31 so as to reduce the volume of the pump gears 30 and 31, and a small oil pump can be produced. However, the present invention is not limited to that described above in that both the pump gears may be of an external type, in which case the pump chamber may have a shape consisting of two circles overlapped at their rims.

The oil pump according to the above-described embodiment is suitable for supplying working oil to an automatic transmission for a vehicle. Since the pump cover 15 is composed of a light alloy having low resistance to cavitation erosion, the pump cover 15 can be integrated with the transmission housing also composed of a light alloy such as aluminum. As a result, the structure of the automatic transmission with the oil pump can be simplified. However, here also, the application of the oil pump according to the present invention is not limited to that described above. The oil pump may be used as a supply source of working oil in various other devices, such as infinitely variable transmissions for vehicles. Also, the pump body may be composed of aluminum or the like having low resistance to cavitation erosion, and the pump cover may be composed of cast iron or the like having high resistance to cavitation erosion, depending on the applications and the circumstances. In this latter case, the length of the notch formed in the pump body composed of aluminum or the like would be made larger than that of the notch formed in the pump cover composed of cast iron or the like.

The invention claimed is:

1. An oil pump comprising:

a pump body having a hollow recess in a side face thereof;

a pump cover having an inner side face closing the hollow recess in the pump body thereby forming a gear compartment;

a drive gear driven by a drive shaft and rotatably supported in the gear compartment;

a rotatable driven gear rotatably supported in the gear compartment in mesh with the drive gear and driven by the drive gear;

a pump body discharge port formed in the pump body and a pump cover discharge port formed in the pump cover, the discharge ports defining, within the gear compartment, a discharge area for working spaces formed by the engagement of teeth of the drive gear with teeth of the driven gear;

a pump body suction port formed in the pump body and a pump cover suction port formed in the pump cover, the suction ports defining, within the gear compartment, a suction area for the working spaces;

a pump body notch formed in the pump body and extending circumferentially from the front end of the pump body discharge port, in a direction reverse to rotation, toward the rear end of the pump body suction port; and a pump cover notch formed in the pump cover and extending from the front end of the pump cover discharge port, in the direction reverse to rotation, toward to the rear end of the pump cover suction port;

wherein one of the pump body and the pump cover is formed of cast iron and the other is formed of a light alloy;

wherein the length of the notch formed in the light alloy is longer than that of the notch formed in the cast iron;

wherein bubbles generated within the oil in the working spaces during high-speed rotation of the drive gear are reduced by the high-pressure working oil flowing back into the working spaces through the longer notch in the light alloy;

wherein the notch formed in the light alloy has (1) an approximately triangular shape and a width decreasing from the front end of the discharge port in the light alloy, in the direction reverse to rotation, toward the rear end of the suction port in the light alloy and (2) an inclined bottom so that its depth decreases from the front end of the discharge port in the light alloy, in the direction reverse to rotation, toward the rear end of the suction port in the light alloy; and wherein, upon rotation of the gears, a working space first communicates with the discharge area through the notch in the light alloy alone, then, upon further rotation, communicates with the discharge area through both the notch in the light alloy and the notch in the cast iron and then, upon yet further rotation, comes into direct communication with the pump body discharge port and the pump cover discharge port.

2. The oil pump according to claim 1, wherein
the driven gear is a rotatable internal gear having its outer circumference supported by the inner circumferential surface of the gear compartment;
the drive gear is an external gear meshing with the driven gear;
the discharge port in the pump body and the discharge port in the pump cover are each arc-shaped; and
the notch in the pump body and the notch in the pump cover extend circumferentially from the front ends of the discharge port in the pump body and the discharge port in the pump cover, respectively, to the rear end of the discharge area.

3. An automatic transmission having a supply source of hydraulic pressure, wherein
the supply source of the hydraulic pressure is the oil pump according to claim 1; and
the pump body or the pump cover formed of the light alloy is integrated with a housing of the automatic transmission.

4. The oil pump according to claim 1, wherein the length of the notch formed in the cast iron is approximately one-quarter to one-half the length of the notch formed in the light alloy.

5. The oil pump according to claim 4, wherein the pump cover is formed of the light alloy.

6. The oil pump according to claim 5, wherein the light alloy is an aluminum alloy.

7. The oil pump according to claim 1, wherein the pump cover is formed of the light alloy.

8. The oil pump according to claim 7, wherein the light alloy is an aluminum alloy.

* * * * *